(12) United States Patent
Kumar et al.

(10) Patent No.: US 9,753,557 B2
(45) Date of Patent: Sep. 5, 2017

(54) FAST INKING A TOUCH DISPLAY

(71) Applicant: INTEL CORPORATION, Santa Clara, CA (US)

(72) Inventors: Arvind Kumar, Beaverton, OR (US); Ajay V. Bhatt, Portland, OR (US); Balaji Vembu, Folsom, CA (US); Murali Ramadoss, Folsom, CA (US); Antonio S. Cheng, Portland, OR (US); John J. Valavi, Hillsboro, OR (US); Chaitanya R. Gandra, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/923,159

(22) Filed: Oct. 26, 2015

(65) Prior Publication Data

US 2017/0115754 A1    Apr. 27, 2017

(51) Int. Cl.
*G06F 3/0354* (2013.01)
*G06F 3/041* (2006.01)

(52) U.S. Cl.
CPC ......... *G06F 3/03545* (2013.01); *G06F 3/041* (2013.01)

(58) Field of Classification Search
CPC .... G06F 3/03545; G06F 3/041; G06F 3/0412; G06F 3/0416; G06F 3/0481; G06F 3/0484; G06F 3/0488; G06K 9/00402
See application file for complete search history.

(56) References Cited

U.S. PATENT DOCUMENTS

| | | | | |
|---|---|---|---|---|
| 6,088,701 A | * | 7/2000 | Whaley | G06F 3/14 |
| 6,141,020 A | * | 10/2000 | Larson | G06T 11/40 |
| | | | | 345/501 |
| 6,771,269 B1 | * | 8/2004 | Radecki | G09G 5/363 |
| | | | | 345/503 |
| 8,884,906 B2 | * | 11/2014 | Vembu | G06T 1/20 |
| | | | | 345/173 |
| 2010/0271313 A1 | | 10/2010 | Low et al. | |
| 2012/0191394 A1 | | 7/2012 | Uzelac et al. | |

(Continued)

FOREIGN PATENT DOCUMENTS

WO    2014097303 A1    6/2014

OTHER PUBLICATIONS

International Search Report for PCT Application No. PCT/US2016/041540, mail date Sep. 12, 2016, 3 pages.

*Primary Examiner* — Tom Sheng
(74) *Attorney, Agent, or Firm* — International IP Law Group, P.L.L.C.

(57) ABSTRACT

An apparatus for fast inking a touch display is described herein. The system for fast inking a touch display can include receiving touch input and generate touch sensor data. The system can include a graphics processing unit (GPU) including a fast inker and a display pipeline. The GPU can transmit human interface device (HID) data generated from the touch sensor data to a writing application memory and the fast inker. The fast inker can convert the HID data into inking data to be sent to the display pipeline through a direct hardware path. The writing application can convert the HID data into inking data to be sent to the display pipeline. The system can also include a touch display to display pixels marked according to the inking data received by the display pipeline.

19 Claims, 6 Drawing Sheets

(56) References Cited

U.S. PATENT DOCUMENTS

| | | | |
|---|---|---|---|
| 2014/0118295 A1 | 5/2014 | Motoi | |
| 2015/0220216 A1* | 8/2015 | Wigdor | G06F 9/4443 |
| | | | 715/765 |
| 2016/0062535 A1* | 3/2016 | Nagasawa | G06F 3/0416 |
| | | | 345/173 |
| 2016/0162061 A1* | 6/2016 | Worfolk | G06T 11/20 |
| | | | 345/173 |
| 2016/0195975 A1* | 7/2016 | Baum | G06F 3/0416 |
| | | | 345/174 |
| 2016/0314615 A1* | 10/2016 | Kim | G06T 15/005 |

* cited by examiner

400

FAST INKING A TOUCH DISPLAY

TECHNICAL FIELD

The present techniques relate generally to improved display speeds for pen/stylus input on touchscreens. More specifically, the present techniques relate to modifying the routing, use, and effect of touchscreen input data to improve display speeds for writing and drawing functions.

BACKGROUND ART

Computing devices with input devices layered on top of their displays can commonly be called touchscreens, or referred to as having a touch display. The input to these devices can come from physical contact, such as through a finger pressing against the touch screen, pressing and dragging, tapping, or other similar interactions with a screen. Similarly, physical touch by a person is not necessary as other touch inputs can include the use of a stylus, pen, pencil, or other contact implement. The input from a stylus can operate through many means including, but not limited to pressure sensing, electronic detection, and conductivity variations due to using the contact implement. In some examples, actual physical contact with a touchscreen may not be necessary for input to register with the touchscreen.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1A:
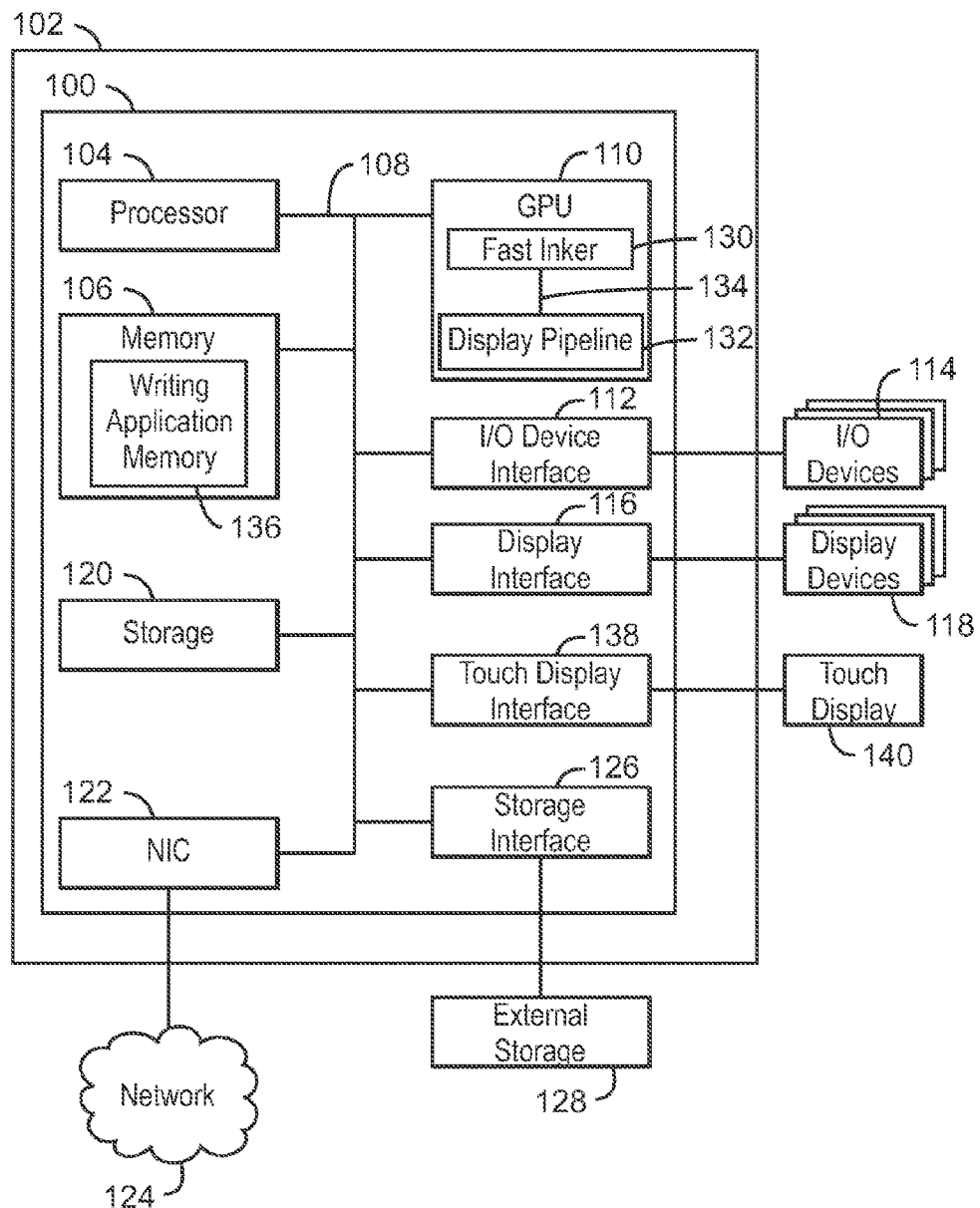
FIG. 1A is a block diagram of an example system on chip (SoC) on a printed circuit board (PCB) for fast inking a touch display.

Writing and drawing, including the use of a stylus can add to the user experience with smoother writing and inking experience. Previous stylus's and touch screens could experience lag which reduces the feeling of writing as the digital time it takes to display the writing is less responsive than a physical pen or pencil would be on a paper. By creating a hardware connection that allows touch input to be displayed before passing through a CPU or writing application, responsiveness can be improved as the lag time from touch to display is decreased due to fewer relatively time consuming processes. One example of latency that can be hidden is the latency of the time it takes for stylus touch input data to be communicated to the operating system.

Rather than attempt to speed up every operation touching the touch data to be displayed, the present disclosure presents techniques to simply avoid those operations altogether through the use of a fast inker and a direct hardware path to the display pipeline. Rather than rely on computationally and time intensive prediction 'prediction' of strokes or other input data, the present disclosure includes techniques that can improve latency without the challenges of predicting direction changes, starts of strokes, or ends of writing strokes. Indeed, predictive solutions to reduce lag time between input and display can often be inaccurate and lead to the unintentional display of artifacts (that can appear like unintended virtual ink drops) on a screen that dirty the displayed image including around corners of lines and the ends of strokes.

In the following disclosure, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It can be apparent, however, to one skilled in the art that these specific details need not be employed to practice the presently disclosed techniques. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the presently disclosed techniques.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Moreover, the apparatus', methods, and systems described herein are not limited to physical computing devices, but may also relate to software optimizations for energy conservation and efficiency. As can become readily apparent in the description below, the embodiments of methods, apparatus', and systems described herein (whether in reference to hardware, firmware, software, or a combination thereof) add to a 'green technology' future balanced with performance considerations.

In an example, a touch integrated circuit (IC) can collect the raw touch/stylus sensor data and send it to graphical processing unit (GPU) via a dedicated hardware path. A touch/stylus algorithm from a third party touch vendor can be executed in the touch device. These touch or stylus algorithms can convert the raw sensor data into screen co-ordinates depicting the touch points. The final processed data can be sent to the operating system. In an example, the architecture can allow for additional processing of the data, or post processing, that allows additional pieces of code to interpret the X,Y coordinates and associated stylus events such as pen-up, pen-down, hover, pressure etc.

In the present disclosure, a post-processing architecture can enable fast inking using a fast inker, which in some cases is a post-processing kernel. In an example, the display rendering can occur on GPU, the fast-inking kernel can create a separate overlay plane that shades the pixels ahead of the application writing to that same display. This overlay plane can be provided by the fast inker to the display pipeline, thus creating a shortcut path that is hardware based and is not dependent on the OS and applications.

FIG. 1A is a block diagram of an example system on chip (SoC) 100 on a printed circuit board (PCB) for fast inking a touch display. The SoC 100 and PCB 102 may be components of, for example, a computing device such as a laptop computer, desktop computer, Ultrabook, tablet computer, mobile device, mobile phone, or server, among others. The SoC 100 may include a central processing unit (CPU) 104 that is configured to execute stored instructions, as well as a memory device 106 that stores instructions that are executable by the CPU 104. The CPU may be coupled to the memory device 106 by a bus 108. Additionally, the CPU 104 can be a single core processor, a multi-core processor, a computing cluster, or any number of other configurations. Furthermore, the SoC 100 may include more than one CPU 104.

The SoC 100 may also include a graphics processing unit (GPU) 110. As shown, the CPU 104 may be coupled through the bus 108 to the GPU 110. The GPU 110 may be configured to perform any number of graphics functions and actions. For example, the GPU 110 may be configured to render or manipulate graphics images, graphics frames, videos, or the like, to be displayed to a user of the SoC 100. The memory device 106 can include random access memory (RAM), read only memory (ROM), flash memory, or any other suitable memory systems. For example, the memory device 106 may include dynamic random access memory (DRAM).

The CPU 104 may be connected through the bus 108 to an input/output (I/O) device interface 112 configured to connect with one or more I/O devices 114. The I/O devices 114 may include, for example, a keyboard and a pointing device, wherein the pointing device may include a touchpad or a touchscreen, among others. The I/O devices 114 may be built-in components of a platform including the SoC 100, or may be devices that are externally connected to a platform including the SoC 100. In embodiments, the I/O devices 114 may be a keyboard or a pointing device that is coupled with the I/O device interface 112.

In an example, the I/O device interfaces 112 can include a connection to the SoC 100 through a Mobile High-Definition Link (MHL) interface. While the I/O devices 114 can connect through an MHL interface to the I/O device, the present techniques disclosed allow the replacement of the adaptor for this standard with a means for transmitting both signal and power over an HDMI interface. In some examples, an MHL interface can provide 40 W of power with the appropriate conversion adaptor to interface with a SoC 100. In an example, an I/O device interface 112 can include a connection to the SoC 100 through a Type-C universal serial bus (USB). As discussed above, the presently disclosed techniques allow the transmitting of signal and power through means other than the Type-C interface, however, the HDMI techniques and the Type-C interface and connection can both co-exist as connections to the SoC 100. In an example, a Type-C interface can allow additional inputs to a computing device or SoC 100. In an example the operating voltage needed to fully power the resources of a SoC 100 can include or exceed 15-25 W, while some I/O device interfaces 112 may be unable to provide this amount of power without additional connections or adaptors.

The CPU 104 may also be linked through the bus 108 to a display interface 116 configured to connect with one or more display devices 118. The display devices 118 may include a screen that is a built-in component of a platform including the SoC 100. Examples of such a computing device include mobile computing devices, such as cell phones, tablets, 2-in-1 computers, notebook computers or the like. The display device 118 may also include a computer monitor, television, or projector, among others, that is externally connected to the SoC 100. In embodiments, the display devices 118 may be a DisplayPort device that is coupled with the display interface 116.

The SoC 100 may also be coupled with a storage device 120. The storage device may be a component located on the PCB 102. Additionally, the storage device 120 can be a physical memory such as a hard drive, an optical drive, a thumb drive, an array of drives, or any combinations thereof. The storage device 120 may also include remote storage drives. The SoC 100 may also include a network interface controller (NIC) 122 may be configured to connect the SoC 100 through the bus 108, various layers of the PCB 102, and components of the PCB 102 to a network 124. The network 124 may be a wide area network (WAN), local area network (LAN), or the Internet, among others.

The SoC 100 can also be coupled to a storage interface 126 configured to connect to at least one external storage 128. The storage interface 126 can include an interface for secure digital cards, external hard drives, external flash drives, or other types of external data storage devices that can act as external storage 128.

The GPU 110 can include a fast inker 130, a display pipeline 132, and a direct hardware path 134 between the fast inker 130 and the display pipeline 132. The fast inker 130 can be a module, a kernel implemented in the memory and processing resources of the GPU 110, an integrated circuit, or any other similar resource capable of storing and modifying data. The fast inker 130 can receive data related to the touch input and convert the data into a format indicating which pixels should be shaded. The display pipeline 132 can include a module, a buffer for the pixels of a touch display, an integrated circuit, or any other similar resource capable of storing pixel data and providing such data to a touch screen upon a screen refresh. In an example, the display pipeline can employ pixel shading, overlay planes, a computer shader, a fixed function block, or other suitable means of storing pixel data and providing this data to the touch screen. The display pipeline 132 can store incoming inking data as directed and use this data to push or provide upon request a signal to a touch screen that can indicate the color, value, brightness, or appearance of pixels on a display. The direct hardware path 134 is "direct" in that it allows the transfer of data from the fast inker 130 to the display pipeline using on the resources of the GPU 110. Alternatively, the direct hardware path 134 is direct in that it allows the transfer of data from the fast inker 130 to the display pipeline 132 without providing the transferred data to the processor 104, an operating system executing on the processor 104, or to a separate memory 106 or storage 120.

The memory 106 can also include a writing application memory 136 to store data of a writing application that can execute instructions using a processor based on writing input data. In an example, the writing application memory 136 can receive touch input from the GPU 110 allocate store the input in a memory 106 or storage 120, convert the data to a user selected writing style, and convert the final form of the writing or drawing to the GPU 110 and display pipeline 132 for display on the screen.

The SoC 100 can also be coupled to a touch display interface 138 to connect to a touch display 140. The touch display interface 138 can be a touch integrated circuit that collects raw touch or stylus sensor information from the touch display 140 to send this touch input to the GPU 110. The touch display 140 includes touch sensors to detect the pressure of touch of a passive stylus, or the presence of an active stylus providing proximity and positioning data. No matter the type of data, to include pressure touch input, conductive touch input, active stylus touch input, or other similar types of input, the data collected by the touch display can be collected by the touch display interface 138 and sent to the GPU 110. The touch display also can display the inking data stored in the display pipeline 132. The touch display can receive this data pushed to it by the display pipeline 132 or can request the data in the form of a display refresh.

It is to be understood that the block diagram of FIG. 1 is not intended to indicate that the SoC 100 is to include all of the components shown in FIG. 1. Rather, the SoC 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate communications between components. For example, embodiments of the present techniques can also be implemented any suitable electronic device, including ultra-compact form factor devices, such as SoC and multi-chip modules.

Figure 1B:
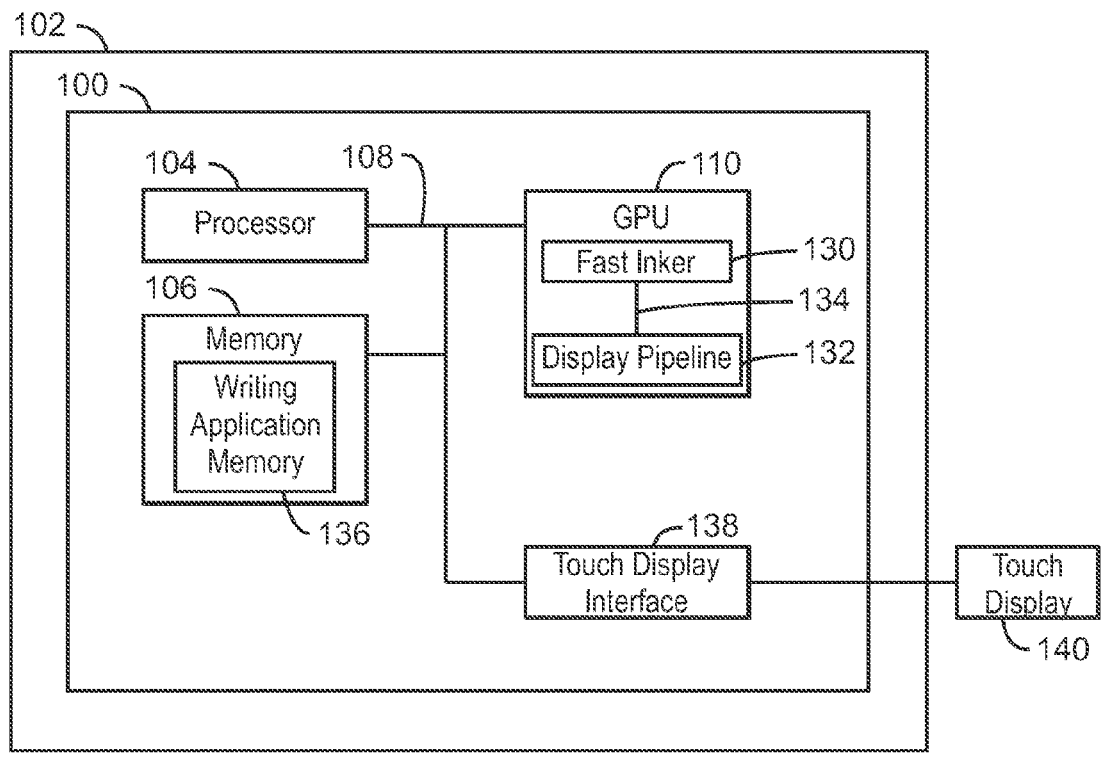
FIG. 1B is a schematic diagram of a simplified example of an apparatus for fast inking a touch display.

FIG. 1B is a schematic diagram of a simplified example of an apparatus for fast inking a touch display. Like numbered items are as described in FIG. 1A.

The SoC 100 can include touch display 140 to receive a touch input, as discussed above. This touch input can be based on a number of sensors conveying a particular coordinate of touch by a stylus. This touch data from the touch sensors of the touch display 140 can be gathered by a touch display interface 138 and provided to a GPU 110. The GPU 110 can use a variety of methods and executed kernels in the GPU 110 to generate human interface device (HID) data that can be commonly used by writing applications stored and executing on data in a writing application memory 136. In the present disclosure, the GPU 110 can provide the HID data to both the writing application memory 136 and the fast inker 130 at the same time. The fast-inker can be what is called a post-processing kernel as the processing the fast inker can perform is often performed after the initial conversion of the input sensor data into HID data. The fast inker can also maintains an array set of X,Y coordinates to mark a particular time duration of touch input, which can be referred to as an inking time duration. In an example, the inking time duration can be hard set to include the last 200 milliseconds (ms) of X,Y coordinates recorded by the touch display 140. In another example, the inking time duration can be greater than 200 milliseconds. In an example, the inking time duration can be less than 200 milliseconds. The array set of X,Y coordinates can also include several elements to aid with storing the touch data received by the fast inker 130 over time. For example, as the fast inker 130 can record data for discrete time intervals, the number of elements in an array set can be determined by the stylus report rate. This stylus report rate can include be provided by the stylus itself in the case of an active status, or snapshots of touch input taken for a certain duration of time if the stylus or touch input is from a passive touch data input.

For example, for 100 Hz stylus report rate, there can be an element for the fast inker 130 coordinates every 10 ms. In this example, the buffer size to hold the fast inker 130 touch input data for 200 ms of data is 20. In an example, the fast inker 130 can include a first in, first out (FIFO) buffer. In an example, coordinates older than 200 ms can discarded based on the policy of the particular fast inker 130 and buffer. A specific value such as 200 ms can be used as some application or device latency time match 200 ms and for these devices, as many touch data analyzed and returned from a writing application memory 136 could take approximately 200 ms to provide more permanent pixel shading data. Furthermore, different other algorithms can be created to determine the specific co-ordinates that can be used for the fast-inking. Fast-Inker 130 can use the touch input or the HID data to connect the X,Y co-ordinates into a smoothed curve and determine the display pixels that need to be shaded. This set of display pixels is provided to the display pipeline 132 so that those indicated pixels can be displayed on the next display refresh cycle.

Figure 2:
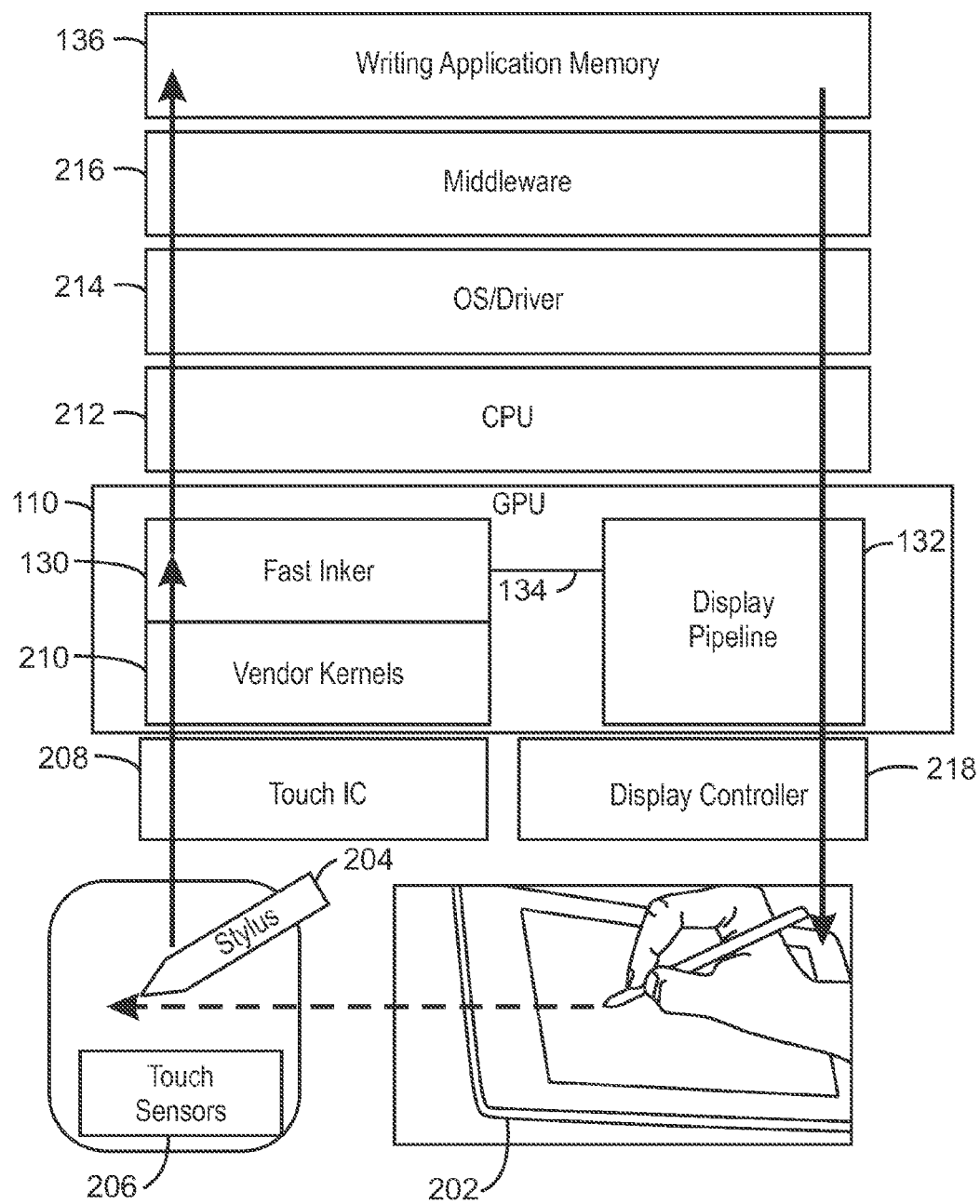
FIG. 2 is a block diagram of an example architecture and data flow fast inking a touch display.

FIG. 2 is a block diagram of an example architecture 200 and data flow fast inking a touch display. Like numbered items are as describe in FIG. 1.

A touchscreen device 202 can record touch sensor input when a stylus 204 touches the touch sensors 206 of the touchscreen. The touch screen device 202 can be any device with a touchscreen or similar capability. Similarly, the stylus can be any implement including a finger, a plastic passive stylus, and an active stylus. In an example an active stylus can provides and electrical event signal to the touch screen device 202 upon certain actions including touching, or pressure sensed by the stylus. In an example, the stylus 204 touches the screen of the touchscreen device 202 at a position X,Y.

In an example the touch sensors 206 can be arrange in a grid of capacitive touch sensors 206 on the screen of the touch screen device 202. The touch sensors 206 can capture the signal changes from a stylus. The signals captured can be read by a touch controller 208. In an example, the stylus and touch from the stylus is detected by the same set of sensors.

The raw data detected by the touch sensors 206, can then be processed by the touch controller and sent to a processing resource such as a system on a chip, a central processing unit, or a graphics processing unit for further processing. FIG. 2 shows the touch input proceeding into the GPU 110 first to vendor kernels 210 implemented on the GPU 110. An initial processing operation for the input data received by the GPU 110 can include the extraction of X,Y co-ordinates for conversion into human interface device (HID) data that can be used by writing software and other similar kernels operating on a computing device. The vendor kernels 210 can include kernels implemented by a third party on a GPU 110 or installed especially for graphics handling. The GPU can send the HID data from the vendor kernels 210 through a CPU 212 to the driver or OS 214, and through middleware 216 to a writing application memory 136 of the touchscreen device. The writing application memory 136 can be storing and executing a writing application such that upon receiving HID data, the writing application memory can process the data and create stroke data. The writing application memory 136 can use the OS 214 interface to update an application window. The OS 214 can also sends the stroke data, generated by the writing application, to the GPU 110 and graphics engine therein. In an example, a display pipeline 132, can include the efforts of the graphics engine and render the stroke data or pixel data for the touch screen display 202 via the display controller 218.

Based on the pixel data or stroke data received, the display can render shading at the X,Y positions indicated by the information provided to the display controller 218 by the display pipeline 132. This general flow and architecture from the GPU 110 sending the HID data to the writing application memory 136 and the pixel data being transferred from the writing application memory 136 to the display pipeline 136 and displayed on the screen can take anywhere from 80 ms-120 ms. This amount of time can appear as lag as the stylus may have moved quickly enough that a gap can be seen in the writing or drawing on the screen between where the stylus 204 is touching and where the touchscreen device 202 displays shaded pixels. By adding the fast inker 130 and the direct hardware path 134, as shown in FIG. 2, the lag time can be decreased resulting in a more responsive experience of touching a touchscreen device. In an example, these additions can result in a user seeing shading more quickly and if moving the stylus, decreasing a gap between the touch location and the shaded pixels.

As discussed herein, the addition of the fast inker 130 allows the touch input to travel two paths. A first path discussed above where the touch input travels through a GPU 110 to a writing application 136 and back for display. A second path can occur when the GPU 110 provides HID data to the fast inker 130 to process and convert into inking data as discussed herein. The inking data can be sent by the fast inker through the direct hardware path 134 to the display pipeline 132. As illustrated by FIG. 2, using this fast inker and direct hardware path allows the display pipeline 136 to have the inking data without the delay of passing through other elements including the writing application 136. While in theory use of the fast inker path by itself could display the data quickly, both paths are used so that the input sensor data, and what is displayed on the screen can be processed by elements of the touchscreen device 202 other than the GPU 110. In this manner, the inking data provided by the fast inker to the display pipeline can be displayed very quickly while the later arriving inking data from the writing application can also be displayed. One benefit of using both paths includes reduced lag time, but also the ability to store the writing data more long term based on direction from the OS 214, have additional processing done on the writing based—for example, optical text recognition (OCR) from software implemented from the middleware 216, or so that the writing or drawing can include styling information from the writing application memory 136 and other similar modifications.

Figure 3:
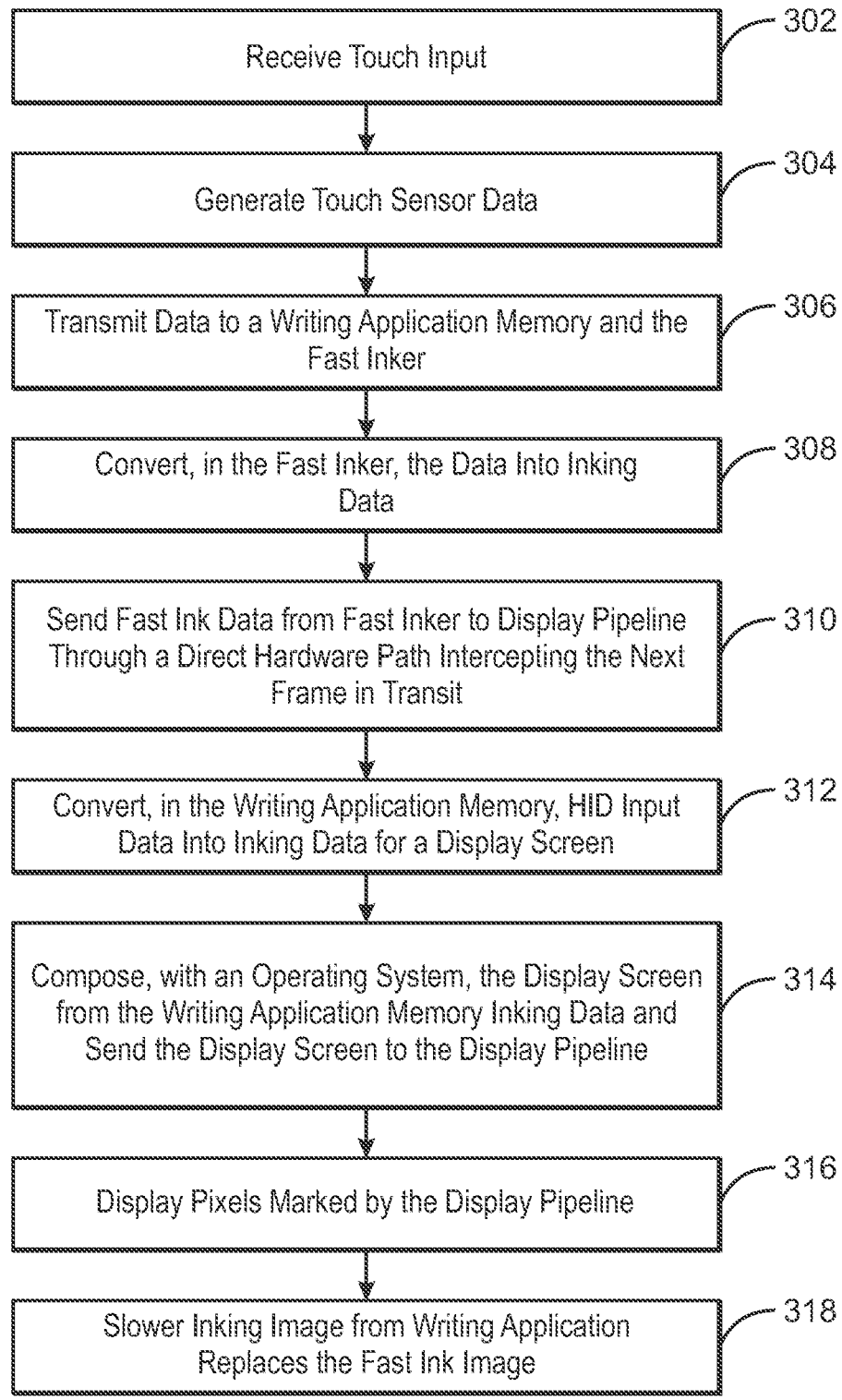
FIG. 3 is a process flow diagram describing an example method for fast inking a touch display.

FIG. 3 is a process flow diagram describing an example method for fast inking a touch display. Process flow begins at block 302.

At block 302, a touch display can receive a touch input. As discussed herein, the touch input can be from a stylus, a finger, or any other suitable implement to provide touch input to touch screen.

At block 304, touch sensor data can be generated from the touch input. This can occur in a number of places include a touch IC 208, a GPU 110, or another suitable processing resource such as a processor 104 with an attached memory 106.

At block 306, at GPU 110 can transmit human interface device (HID) data generated from the touch sensor data in a graphics processing unit (GPU) 110 to a writing application memory 136 and the fast inker 130. As the fast inker 130 can be present in the GPU 110 the transmission to the fast inker 130 may not be necessary or may simply be trivial as the data may already be accessible to the fast inker 130.

At block 308, the fast inker 130 can convert the HID data into inking data. This can include a conversion from raw sensor data to a coordinate system or set of coordinates for each time period of touch input data measured.

At block 310, the fast inker 130 can send the inking data from the fast inker to the display pipeline 132 through a direct hardware path 134 intercepting the next frame in transit. The direct hardware path allows the display pipeline to have the inking data for a touch input without the intermediate elements of a writing application memory, operating system, or other time consuming operations. As used herein, intercepting the next frame in transit refers to the next frame transiting in a display pipeline to be displayed on the touch screen. Intercepting this next frame for display can include the addition, replacement, or modification of the data in the next frame based on the inking data sent from the fast inker.

At block 312, the writing application receives the HID input data and can convert it into inking data for a display screen. As used herein, a display screen can refer to a digital panel overlay, the storage of coordinates and inked coordinates that correspond to the touch display, or any other structure for display pipeline data storage. While the conversion to inking data is taking place, other stylistic changes can be added by the writing application memory include the addition of line weight, various shading color variances, and other similar modifications to writing or drawing.

At block 314, the operating system composes the display screen from the inking data from the writing application memory and sends the display screen to the display pipeline. Due to the extra operations involved, the display pipeline likely already has inking data from the touch input being used by the writing application memory. However, the inking data from the fast inker 130 is provided by the fast inker 130 for a limited duration, before no longer being provided directly to the display pipeline 132. Further, the inking data from the fast inker 130 may not have modification imposed by the writing application memory 136 or enacted through processing with the CPU 212, OS 214, and middleware 216. Accordingly, the pixel display data can be replaced by the pixel display data from the writing application memory 136, or alternatively, each pixel display data can be stored or even displayed on a different panel from the display pipeline 132.

At block 316, the touch display can display the pixels marked by the display pipeline 132 based on the inking data received from both the fast inker 130 and the writing application memory 136. The touch display does not need to wait for both inking data to begin displaying the inking data from one source or another.

At block 318, the slower inking image from the writing application replaces the fast ink image. As discussed herein, this can occur through an explicit replacement of the fast ink image by the slower inking image from the writing application. In another example, the replacement of the fast inking image by the slower inking image can occur through the fast inker providing inking data for a particular input for a limited time, e.g. 200 ms. In this example, the inking data from the fast inker appears to expire or disappear while the slower inking image from the writing application is present.

Figure 4:
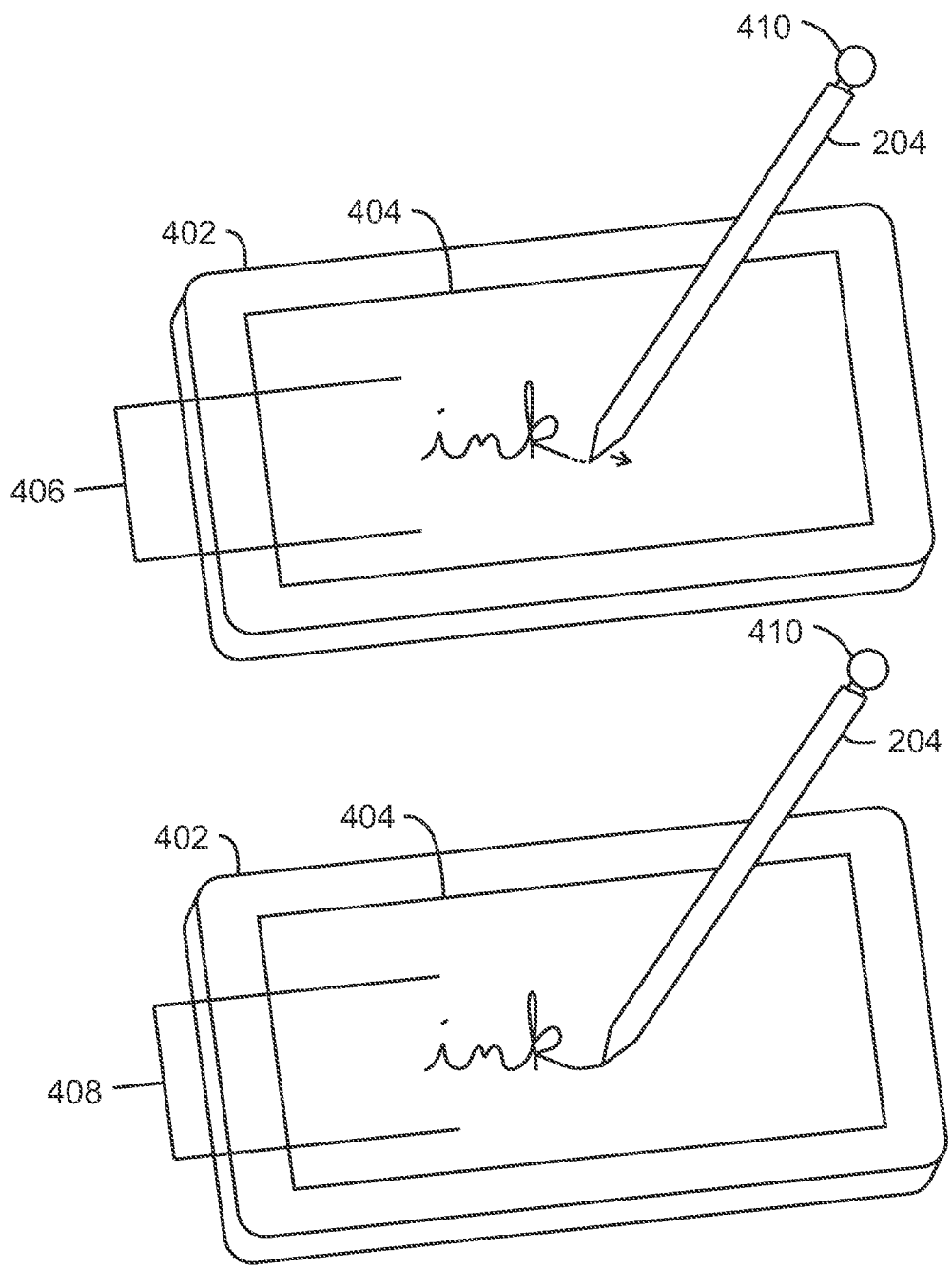
FIG. 4 is shows an example comparison of the effects for a device fast inking and not using fast inking for a touch display.

FIG. 4 is shows an example comparison 400 of the effects for a device fast inking and not using fast inking for a touch display. Like numbered items are as described in FIG. 1 and FIG. 2.

FIG. 4 shows at least a computing device 402 with a touchscreen 404. Two versions are shown, where the first is a computing device 402 using standard display architecture and techniques 406 and the second is a computing device 402 using fast inking 408 architecture and techniques.

The computing device 402 using standard display architecture and techniques 406 shows a stylus 204 writing the word "ink" on the touchscreen by touch or active proximity to the touchscreen. As no fast-inking is used in this example, there can be lag in the writing, shown here by the dashed line at the bottom of the cursive "k." This dashed line shows the movement the stylus 204 has been dragged across the touchscreen 404 to provide a touch input. However, due to the use of typical architecture and techniques, the touchscreen 404 displays the touch data that has had time to filter through the operating system, CPU, writing application, and other software and modules.

The computing device 402 using the fast inking techniques. Due to the faster display of touch input data on the touchscreen enabled by the fast inker and the direct hardware path to the display pipeline 136, their does not appear to be a gap between where the stylus is touching/moving, and where ink or shaded pixels are being displayed.

In an example, the computing device 402 can detecting a pen-up, or a pen-down event from either an active stylus that communicates electronically with the touch screen. The fast inker 130 can detect the pen-up and pen-down events and react accordingly, particularly as these events can be a part of the HID data packets that are the output of the vendor kernels 210. In an example, when a pen-down event happens, the fast inker can be activated and starts filling up coordinate buffers that correspond to the displayable pixels of the touch display. When a pen-up event happens, the fast inker 130 can stop filling up any more data into its coordinate buffers. Old data in the fast inkers clears after an inking time duration. For example, the fast inker buffers can become empty after 200 ms from the pen-up event. When the fast inker 130 buffers are empty, then there may be nothing for the fast inker 130 to do, and the fast inker can become a passthrough element in the architecture.

In the examples seen above, data go to both the fast inker 130 and the writing application memory 136. The writing application memory continues to send the normal inking data to the operating system (OS) inking infrastructure, which can converts it into the pixel data for display. This 'normal' inking can be ultimately displayed on the touch display and can overwrite the fast-inking pixels. In an example, the use of the fast inker 130 can be limited to time of writing. Indeed, the use of a fast inker aware of a current mode of a device would avoid a few pitfalls of leaving the fast inker 130 active in all modes. For example, if the fast inker 130 were active at all times, a user could be using the stylus to point to some icons, selecting icons, and using the stylus as a mouse. In these and other similar situations, the fast inker 130 may not assist with the task at hand. Accordingly, in a detected mode not for writing, the fast inker 130 can become a passthrough element. In one example of managing this setting, the mode can be determined from the application side of a computing device. If a mode can be set by a specific application program interface (API) this API could be called by a writing application to inform the fast inker 130 that the application window in focus has a writing/drawing canvas, and the coordinates of the canvas are provided. In another example, this mode control can be also implemented in middleware. In an example, the middleware can convey the mode to a fast inker via shared memory buffers.

In an example, an eraser mode can be used to erase data previously generate through touching a screen or even data displayed on a screen but never generated by touch input. While the application is actively writing, user could press an eraser button 410 on the stylus, or turn it on its tail side to make it behave as an eraser. This event 'eraser mode' can be reflected in the HID packets which the fast-inking PPK has access to. When the eraser mode can be detected, all the shading buffers are cleared. It can be safely assumed that changing into the eraser mode by human action will take more than 200 ms, so the buffers can be cleared without any worries. The writing application or OS can also change the mode to the eraser mode. This can be communicated to the fast-inking using the same API as described above for detection of the writing mode. In an example, it may be desired for the fast inker to know the color of the ink and width of the stroke so that the pixels can be colored in the right color. This can be communicated through the API.

It should be noted that the techniques described herein can be performed in various implementations including where the touch controller does the processing of the raw data, prepares the HID packets and sends this data to the OS and fast inker. Further, the HID packets (containing X,Y coordinates) can instead be snooped by the SoC with the fast inker 130, and the techniques described above can be implemented in a microcontroller that can create an overlay buffer for use by a graphics engine for display. In an example, the microcontroller could have direct access to graphics hardware such that the overlay buffers can be used by the display in the next display refresh cycle.

Figure 5:
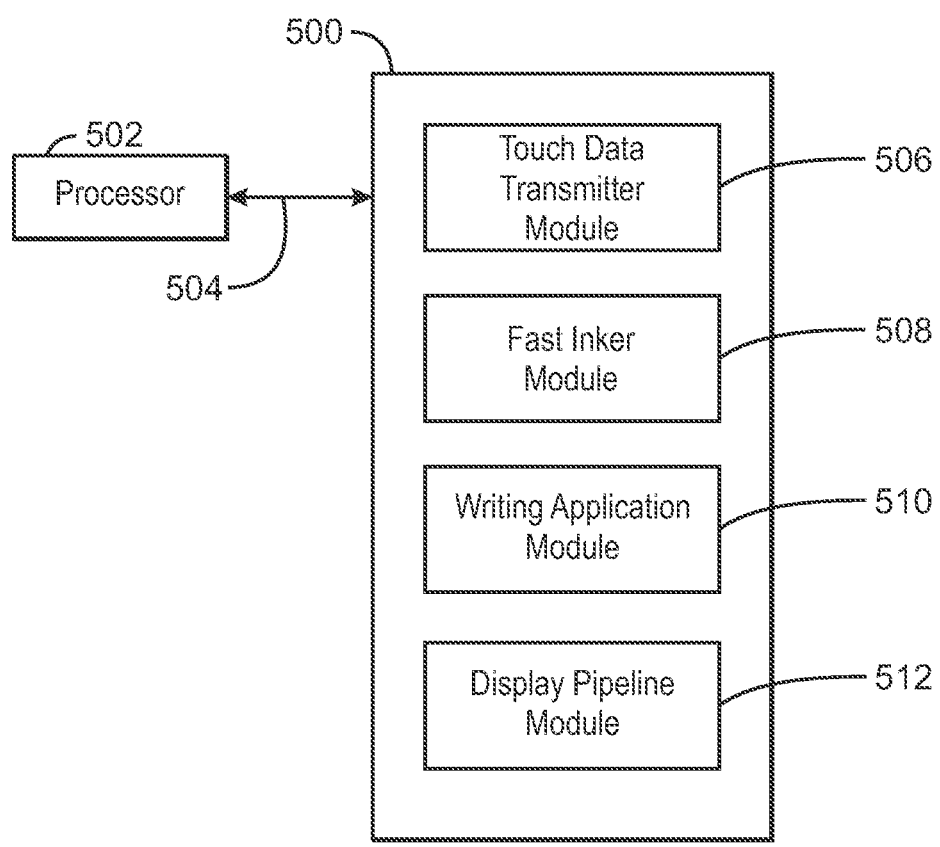
FIG. 5 is a block diagram showing tangible, non-transitory computer-readable media that stores code for power transmission with an HDMI.

FIG. 5 is a block diagram showing tangible, non-transitory computer-readable media that stores code for power transmission with an HDMI. The tangible, non-transitory computer-readable media 500 may be accessed by a processor 502 over a computer bus 504. Furthermore, the tangible, non-transitory computer-readable medium 500 may include code configured to direct the processor 502 to perform the methods described herein.

The tangible, non-transitory computer-readable media 500 can include a touch data transmitter module 506, to transmit touch data to a fast inker and a writing application. In an example, the touch data transmitter module 506 can receive raw touch sensor data and convert it to HID data as described above.

The tangible, non-transitory computer-readable media 500 can include a fast inker module 508, to convert the HID data into inking data to be sent to the display pipeline through a direct hardware path. In an example, the fast inker module can be located on a GPU 110.

The tangible, non-transitory computer-readable media 500 can include a writing application module 510, to convert the HID data into inking data to be sent to the display pipeline. In an example, the writing application module and the fast inker module receive the touch HID data concurrently but can send the converted inking data at different times, the fast inker typically first.

The tangible, non-transitory computer-readable media 500 can include a touch display pipeline processing module 512, to receive inking data, typically from the writing application and the fast inker. In an example, the display pipeline can provide the inking data to the display as soon as the display pipeline receives the inking data. In an example, the display pipeline includes separate overlays for the inking data the display pipeline receives from the fast inker compared to the writing application module.

The tangible, non-transitory computer-readable media 500 can include a HDMI power manager module 508, to be embodied at least partly in hardware or circuitry, and to include instructions including HDMI power management 136 to instruct a processor 502. In an example, the HDMI power manager module 508 can provide power through the HDMI from a power supply 202 of the computer-readable medium 500 to a computing device based on the detected connection state and the energy request of a connected computing device.

The block diagram of FIG. 5 is not intended to indicate that the tangible, non-transitory computer-readable media 500 is to include all of the components shown in FIG. 5. Further, the tangible, non-transitory computer-readable media 500 may include any number of additional components not shown in FIG. 5, depending on the details of the specific implementation.

EXAMPLES

Example 1 is a system for fast inking a touch display. The system includes a touch display to receive touch input and generate touch sensor data; a graphics processing unit (GPU) comprising a fast inker and a display pipeline; the GPU to transmit human interface device (HID) data generated from the touch sensor data to a writing application memory and the fast inker; the fast inker to convert the HID data into inking data to be sent to the display pipeline through a direct hardware path; the writing application memory to convert the HID data into inking data to be sent to the display pipeline; and the touch display to display pixels marked by the display pipeline based on the inking data received by the display pipeline.

Example 2 includes the system of example 1, including or excluding optional features. In this example, the touch display to display pixels marked by the display pipeline based on the inking data received by the display pipeline.

Example 3 includes the system of any one of examples 1 to 2, including or excluding optional features. In this example, the system includes a fast inking array of coordinates, stored in the fast inker, corresponding to the display pixels, the fast inker to mark the fast inking array of coordinates to correspond to HID data for an inking time duration. Optionally, the system includes the inking data sent to the display pipeline includes the marked fast inking array of coordinates, and the inking time duration is at least 200 milliseconds. Optionally, the system includes the fast inking array of coordinates includes marking pixels from HID data both during the inking time duration and at a rate corresponding to the frequency touch input is received.

Example 4 includes the system of any one of examples 1 to 3, including or excluding optional features. In this example, the system includes a stylus to generate the touch input to produce HID input comprising at least one of a pen-down event to indicate when a stylus is placed down against the touch display, touch coordinates to indicate the movement of the stylus on the touch display, and a pen-up event to indicate the stylus has been lifted from the touch display. Optionally, the system includes the stylus provides an eraser mode event to be transmitted to the fast inker, and the fast inker to respond to an eraser mode event by clearing the fast inking array of coordinates.

Example 5 includes the system of any one of examples 1 to 4, including or excluding optional features. In this example, the system includes, the fast inker is to receive style information from the writing application memory to convert the HID data into inking data based additionally on the style information.

Example 6 includes the system of any one of examples 1 to 5, including or excluding optional features. In this example, the system includes an overlay plane of the fast inker to indicate the inking data provided to the display pipeline from the fast inker separately from the inking data to be provided from the writing application memory at the display pipeline.

Example 7 includes the system of any one of examples 1 to 6, including or excluding optional features. In this example, the system includes the display pipeline is to receive the inking data from the fast inker prior to receiving display pipeline data from the writing application memory.

Example 8 is a method for fast inking a touch display. The method includes receiving touch input a touch display; generating touch sensor data from the touch input; transmitting human interface device (HID) data generated from the touch sensor data in a graphics processing unit (GPU) to a writing application memory and the fast inker; converting, in the fast inker, the HID data into inking data; sending the inking data from the fast inker to a display pipeline through a direct hardware path intercepting the next frame in transit; converting, in the writing application memory, the HID data into inking data for a display screen; composing, with an operating system, the display screen from the writing application memory inking data and send the display screen to the display pipeline; displaying pixels marked by the display pipeline on the touch display based on the inking; replacing the inking data with the display screen received by the display pipeline.

Example 9 includes the method of example 8, including or excluding optional features. In this example, the transmitting HID data to and from the writing application memory from the GPU comprises passing the HID data out of the GPU and through at least one of a computer processing unit (CPU), operating system, driver, and middleware.

Example 10 includes the method of any one of examples 8 to 9, including or excluding optional features. In this example, the method includes storing a fast inking array of coordinates in the fast inker to correspond to the display pixels, the fast inker to mark the fast inking array of coordinates to correspond to HID data for an inking time duration. Optionally, the method includes method of example 13, the inking data sent to the display pipeline from the fast inker includes the marked fast inking array of coordinates, and the inking time duration is no greater than 200 milliseconds. Optionally, the method includes the fast inking array of coordinates includes marking pixels from HID data both during the inking time duration and at a rate corresponding to the frequency touch input is received.

Example 11 includes the method of any one of examples 8 to 10, including or excluding optional features. In this example, the method includes generating the touch input with a stylus to produce HID input comprising at least one of a pen-down event to indicate when a stylus is placed down against the touch display, touch coordinates to indicate the movement of the stylus on the touch display, and a pen-up event to indicate the stylus has been lifted from the touch display. Optionally, the method includes the stylus provides an eraser mode event to be transmitted to the fast inker, and the fast inker to respond to an eraser mode event by clearing the fast inking array of coordinates.

Example 12 includes the method of any one of examples 8 to 11, including or excluding optional features. In this example, the method includes receiving style information, at the fast inker, from the writing application memory to convert the HID data into inking data based additionally on the style information.

Example 13 includes the method of any one of examples 8 to 12, including or excluding optional features. In this example, the method includes indicating, on an overlay plane of the fast inker, the inking data provided to the display pipeline from the fast inker separately from the inking data to be provided from the writing application memory at the display pipeline.

Example 14 includes the method of any one of examples 8 to 13, including or excluding optional features. In this example, the method includes the receiving at the display pipeline of the inking data from the fast inker occurs prior to the receiving of inking data at the display pipeline from the writing application memory.

Example 15 is an apparatus for fast inking a touch display. The apparatus includes a graphics processing unit (GPU) comprising a fast inker and a display pipeline; the GPU to transmit human interface device (HID) data generated from touch sensor data to a writing application memory and the fast inker; the fast inker to convert the HID data into inking data to be sent to the display pipeline through a direct hardware path; and the writing application memory to convert the HID data into inking data to be sent to the display pipeline.

Example 16 includes the apparatus of example 15, including or excluding optional features. In this example, the apparatus includes the transmitting HID data to and from the writing application memory from the GPU comprises passing the HID data out of the GPU and through at least one of a computer processing unit (CPU), operating system, driver, and middleware.

Example 17 includes the apparatus of any one of examples 15 to 16, including or excluding optional features. In this example, the apparatus includes a fast inking array of coordinates, stored in the fast inker, corresponding to the display pixels, the fast inker to mark the fast inking array of coordinates to correspond to HID data for an inking time duration. Optionally, the apparatus includes apparatus of claim 23, the inking data sent to the display pipeline includes the marked fast inking array of coordinates, and the inking time duration is at least 200 milliseconds. Optionally, the apparatus includes the fast inking array of coordinates includes marking pixels from HID data both during the inking time duration and at a rate corresponding to the frequency touch input is received.

Example 18 includes the apparatus of any one of examples 15 to 17, including or excluding optional features. In this example, the apparatus includes a stylus to generate the touch sensor data to produce HID input comprising at least one of a pen-down event to indicate when a stylus is placed down against a touch display, touch coordinates to indicate the movement of the stylus on the touch display, and a pen-up event to indicate the stylus has been lifted from the touch display. Optionally, the apparatus includes the stylus provides an eraser mode event to be transmitted to the fast inker, and the fast inker to respond to an eraser mode event by clearing the fast inking array of coordinates.

Example 19 includes the apparatus of any one of examples 15 to 18, including or excluding optional features. In this example, the apparatus includes the fast inker is to receive style information from the writing application memory to convert the HID data into inking data based additionally on the style information.

Example 20 includes the apparatus of any one of examples 15 to 19, including or excluding optional features. In this example, the apparatus includes an overlay plane of the fast inker to indicate the inking data provided to the display pipeline from the fast inker separately from the inking data to be provided from the writing application memory at the display pipeline.

Example 21 includes the apparatus of any one of examples 15 to 20, including or excluding optional features. In this example, the apparatus includes the display pipeline is to receive the inking data from the fast inker prior to receiving display pipeline data from the writing application memory.

Example 22 is a tangible, non-transitory, computer-readable medium. The computer-readable medium includes instructions that direct the processor to transmit human interface device (HID) data generated from touch sensor data to a writing application memory and the fast inker; convert, with the fast inker the HID data into inking data to be sent to the display pipeline through a direct hardware path; and convert, with the writing application memory, the HID data into inking data to be sent to the display pipeline.

Example 23 includes the computer-readable medium of example 22, including or excluding optional features. In this example, the computer-readable medium includes transmitting HID data to and from the writing application memory from the GPU comprises passing the HID data out of the GPU and through at least one of a computer processing unit (CPU), operating system, driver, and middleware.

Example 24 includes the computer-readable medium of any one of examples 22 to 23, including or excluding optional features. In this example, the computer-readable medium includes instructions that, when executed by a processor, direct the processor to correspond a fast inking array of coordinates, stored in the fast inker, to the display pixels, the fast inker to mark the fast inking array of coordinates to correspond to HID data for an inking time duration. Optionally, the computer-readable medium includes the inking data sent to the display pipeline includes the marked fast inking array of coordinates, and the inking time duration is at least 200 milliseconds. Optionally, the computer-readable medium includes the fast inking array of coordinates includes marking pixels from HID data both during the inking time duration and at a rate corresponding to the frequency touch input is received.

Example 25 includes the computer-readable medium of any one of examples 22 to 24, including or excluding optional features. In this example, the computer-readable medium includes instructions that, when executed by a processor, direct the processor to generate, with a stylus, the touch sensor data to produce HID input comprising at least one of a pen-down event to indicate when a stylus is placed down against a touch display, touch coordinates to indicate the movement of the stylus on the touch display, and a pen-up event to indicate the stylus has been lifted from the touch display. Optionally, the computer-readable medium includes the stylus provides an eraser mode event to be transmitted to the fast inker, and the fast inker to respond to an eraser mode event by clearing the fast inking array of coordinates.

Example 26 includes the computer-readable medium of any one of examples 22 to 25, including or excluding optional features. In this example, the computer-readable medium includes the fast inker is to receive style information from the writing application memory to convert the HID data into inking data based additionally on the style information.

Example 27 includes the computer-readable medium of any one of examples 22 to 26, including or excluding optional features. In this example, the computer-readable medium includes instructions that, when executed by a processor, direct the processor to indicate, with an overlay plane of the fast inker, the inking data provided to the display pipeline from the fast inker separately from the inking data to be provided from the writing application memory at the display pipeline. Optionally, the computer-readable medium includes the display pipeline is to receive the inking data from the fast inker prior to receiving display pipeline data from the writing application memory.

Example 28 is a system for fast inking a touch display. The system includes instructions that direct the processor to means to receive touch input and generate touch sensor data; a graphics processing unit (GPU) comprising a means for generating inking data and a display pipeline; the GPU to transmit human interface device (HID) data generated from the touch sensor data to a writing application memory and the means for generating inking data; the means for generating inking data to convert the HID data into inking data to be sent to the display pipeline through a direct hardware path; the writing application memory to convert the HID data into inking data to be sent to the display pipeline; and the means to receive touch input and generate touch sensor data to display pixels marked by the display pipeline based on the inking data received by the display pipeline.

Example 29 includes the system of example 28, including or excluding optional features. In this example, the system includes the transmitting HID data to and from the writing application memory from the GPU comprises passing the HID data out of the GPU and through at least one of a computer processing unit (CPU), operating system, driver, and middleware.

Example 30 includes the system of any one of examples 28 to 29, including or excluding optional features. In this example, the system includes a fast inking array of coordinates, stored in the means for generating inking data, corresponding to the display pixels, the means for generating inking data to mark the fast inking array of coordinates to correspond to HID data for an inking time duration. Optionally, the system includes the inking data sent to the display pipeline includes the marked fast inking array of coordinates, and the inking time duration is at least 200 milliseconds. Optionally, the system includes the fast inking array of coordinates includes marking pixels from HID data both during the inking time duration and at a rate corresponding to the frequency touch input is received.

Example 31 includes the system of any one of examples 28 to 30, including or excluding optional features. In this example, the system includes a stylus to generate the touch input to produce HID input comprising at least one of a pen-down event to indicate when a stylus is placed down against the means to receive touch input and generate touch sensor data, touch coordinates to indicate the movement of the stylus on the means to receive touch input and generate touch sensor data, and a pen-up event to indicate the stylus has been lifted from the means to receive touch input and generate touch sensor data. Optionally, the system includes the stylus provides an eraser mode event to be transmitted to the means for generating inking data, and the means for generating inking data to respond to an eraser mode event by clearing the fast inking array of coordinates.

Example 32 includes the system of any one of examples 28 to 31, including or excluding optional features. In this example, the system includes the means for generating inking data is to receive style information from the writing application memory to convert the HID data into inking data based additionally on the style information.

Example 33 includes the system of any one of examples 28 to 32, including or excluding optional features. In this example, the system includes an overlay plane of the means for generating inking data to indicate the inking data provided to the display pipeline from the means for generating inking data separately from the inking data to be provided from the writing application memory at the display pipeline.

Example 34 includes the system of any one of examples 28 to 33, including or excluding optional features. In this example, the system includes the display pipeline is to receive the inking data from the means for generating inking data prior to receiving display pipeline data from the writing application memory.

While the present techniques have been described with respect to a limited number of embodiments, those skilled in the art can appreciate numerous modifications and variations therefrom. It is intended that the appended claims cover all such modifications and variations as fall within the true spirit and scope of this present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other language does not necessarily refer to the same embodiment or the same example, but may refer to different and distinct embodiments, as well as potentially the same embodiment.

What is claimed is:

1. A system for fast inking a touch display, comprising:
   a touch display to receive touch input and generate touch sensor data;
   a graphics processing unit (GPU) comprising a fast inker and a display pipeline;
   the GPU to transmit human interface device (HID) data generated from the touch sensor data to a writing application memory and the fast inker;
   the fast inker to convert the HID data into inking data to be sent to the display pipeline through a direct hardware path;
   the writing application memory to convert the HID data into inking data to be sent to the display pipeline
   the touch display to display pixels marked by the display pipeline based on the inking data received by the display pipeline; and
   a fast inking array of coordinates, stored in the fast inker, corresponding to the display pixels, the fast inker to mark the fast inking array of coordinates to correspond to HID data both during an inking time duration and at a rate corresponding to a frequency touch input is received.

2. The system of claim 1, the transmitting HID data to and from the writing application memory from the GPU comprises passing the HID data out of the GPU and through at least one of a computer processing unit (CPU), operating system, driver, and middleware.

3. The system of claim 1, the inking data sent to the display pipeline includes the marked fast inking array of coordinates; and the inking time duration is at least 200 milliseconds.

4. The system of claim 1, comprising a stylus to generate the touch input to produce HID input comprising at least one of a pen-down event to indicate when a stylus is placed down against the touch display, touch coordinates to indicate the movement of the stylus on the touch display, and a pen-up event to indicate the stylus has been lifted from the touch display.

5. The system of claim 4, the stylus provides an eraser mode event to be transmitted to the fast inker, and the fast inker to respond to an eraser mode event by clearing the fast inking array of coordinates.

6. The system of claim 1, the fast inker is to receive style information from the writing application memory to convert the HID data into inking data based additionally on the style information.

7. The system of claim 1, comprising an overlay plane, created by a fast inking kernel, to indicate the inking data provided to the display pipeline from the fast inker separately from the inking data to be provided from the writing application memory at the display pipeline.

8. The system of claim 1, the display pipeline is to receive the inking data from the fast inker prior to receiving display pipeline data from the writing application memory.

9. A method for fast inking a touch display, comprising:
   receiving touch input a touch display;
   generating touch sensor data from the touch input;
   transmitting human interface device (HID) data generated from the touch sensor data in a graphics processing unit (GPU) to a writing application memory and a fast inker;
   converting, in the fast inker, the HID data into inking data;
   sending the inking data from the fast inker to a display pipeline through a direct hardware path intercepting a next frame in transit;
   converting, in the writing application memory, the HID data into inking data for a display screen;
   composing, with an operating system, the display screen from the writing application memory inking data and send the display screen to the display pipeline;
   displaying pixels marked by the display pipeline on the touch display based on the inking;
   storing a fast inking array of coordinates to correspond to the display pixels, the fast inker to mark the fast inking array of coordinates to correspond to HID data for both an inking time duration and a frequency touch input is received; and
   replacing the inking data with the display screen received by the display pipeline.

10. The method of claim 9, transmitting HID data to and from the writing application memory from the GPU comprises passing the HID data out of the GPU and through at least one of a computer processing unit (CPU), operating system, driver, and middleware.

11. The method of claim 9, the inking data sent to the display pipeline from the fast inker includes the marked fast inking array of coordinates; and the inking time duration is no greater than 200 milliseconds.

12. The method of claim 9, comprising generating the touch input with a stylus to produce HID input comprising at least one of a pen-down event to indicate when a stylus is placed down against the touch display, touch coordinates to indicate the movement of the stylus on the touch display, and a pen-up event to indicate the stylus has been lifted from the touch display.

13. The method of claim 12, the stylus provides an eraser mode event to be transmitted to the fast inker, and the fast inker to respond to an eraser mode event by clearing the fast inking array of coordinates.

14. The method of claim 9, comprising receiving style information, at the fast inker, from the writing application memory to convert the HID data into inking data based additionally on the style information.

15. The method of claim 9, comprising indicating, on an overlay plane created by a fast inking kernel, the inking data provided to the display pipeline from the fast inker separately from the inking data to be provided from the writing application memory at the display pipeline.

16. The method of claim 9, the receiving at the display pipeline of the inking data from the fast inker occurs prior to receiving of inking data at the display pipeline from the writing application memory.

17. An apparatus for fast inking a touch display, comprising:
a graphics processing unit (GPU) comprising a fast inker and a display pipeline;
the GPU to transmit human interface device (HID) data generated from touch sensor data to a writing application memory and the fast inker;
the fast inker to convert the HID data into inking data to be sent to the display pipeline through a direct hardware path
the writing application memory to convert the HID data into inking data to be sent to the display pipeline; and
the fast inker to mark a fast inking array of coordinates to correspond to HID data for both an inking time duration and a frequency touch input is received.

18. The apparatus of claim 17, the transmitting HID data to and from the writing application memory from the GPU comprises passing the HID data out of the GPU and through at least one of a computer processing unit (CPU), operating system, driver, and middleware.

19. The apparatus of claim 17, the inking data sent to the display pipeline includes the marked fast inking array of coordinates; and the inking time duration is at least 200 milliseconds.

* * * * *